United States Patent [19]

Dionne

[11] Patent Number: 5,323,981

[45] Date of Patent: Jun. 28, 1994

[54] SPLICER TAPE SYSTEM

[75] Inventor: Donald Dionne, Glen Ridge, N.J.

[73] Assignee: Sequa Corporation, New York, N.Y.

[21] Appl. No.: 975,649

[22] Filed: Nov. 13, 1992

Related U.S. Application Data

[63] Continuation-in-part of Ser. No. 807,440, Dec. 13, 1991, abandoned.

[51] Int. Cl.⁵ .............................................. B65H 19/18
[52] U.S. Cl. ..................................... 242/58.5; 156/502
[58] Field of Search ............... 242/58, 58.1, 58.2, 242/58.3, 58.4, 58.5, 58.6; 156/157, 159, 502, 504, 505, 507

[56] References Cited

U.S. PATENT DOCUMENTS

| | | | |
|---|---|---|---|
| 1,739,381 | 12/1929 | Wood | 242/58.5 |
| 1,996,497 | 4/1935 | Wood | 242/58 |
| 2,005,037 | 6/1935 | Johancen et al. | 242/58.5 |
| 2,149,832 | 3/1939 | Bernard | 242/58 |
| 2,212,937 | 8/1940 | Horton | 242/58 |
| 2,377,971 | 6/1945 | Roesen | 242/58 |
| 2,386,345 | 10/1945 | Roesen | 242/58 |
| 2,413,581 | 12/1946 | Roesen | 242/58 |
| 2,812,145 | 11/1957 | Meloche | 242/58.5 |
| 2,920,835 | 1/1960 | Gibson | 242/58.5 |
| 3,001,735 | 9/1961 | Francik | 242/58.5 |
| 3,006,568 | 10/1961 | Willis | 242/58.5 |
| 3,186,892 | 6/1965 | Walthers | 242/55.2 |
| 3,198,452 | 8/1965 | Buettel | 242/58.5 |
| 3,547,739 | 12/1970 | Beute | 156/504 |
| 3,724,033 | 4/1973 | Baker | 242/58.5 X |
| 4,238,261 | 12/1980 | Tetro | 156/157 |
| 4,466,577 | 8/1984 | Focke et al. | 242/58 |
| 4,575,017 | 3/1986 | Pali | 242/58.3 |
| 4,802,632 | 2/1989 | Fukuda et al. | 242/58.5 |
| 4,905,924 | 3/1990 | Moore | 242/58.5 |
| 5,212,002 | 5/1993 | Madrzak et al. | 242/58.1 X |

FOREIGN PATENT DOCUMENTS

| | | | |
|---|---|---|---|
| 591964 | 9/1947 | United Kingdom | |
| 2223739 | 4/1990 | United Kingdom | 242/71.8 |

Primary Examiner—Daniel P. Stodola
Assistant Examiner—John P. Darling
Attorney, Agent, or Firm—Mitchell D. Bittman

[57] ABSTRACT

A splicer tape is provided for holding down the leading end portion of the outer layer of a new roll of web and for enabling the leading end portion of the new roll to be spliced to the trailing end portion of an active web. The tape contains an elongated strip of carrier material having inner and outer sides with the inner side of the strip having a first and second longitudinally extending section and preferably having an intermediate longitudinally extending section located between the first and second sections, said intermediate section being free of adhesive. A first adhesive is applied onto the first section and comprises a non-releasable adhesive which is to be applied against the leading end portion of the new roll. A second adhesive is applied onto the second section of the inner side of the carrier strip and comprises a releasable adhesive which is to be applied against the body of the new roll to hold the leading edge of the new roll down until the leading edge of the new roll is spliced to the trailing end portion of the active web whereupon the second adhesive releases from the body of the new roll without leaving any portion of the tape on the roll body. A third adhesive is applied on the outer side of the carrier strip and it comprises a non-releasable adhesive which is to be applied against trailing end portions from the active web during splicing.

14 Claims, 6 Drawing Sheets

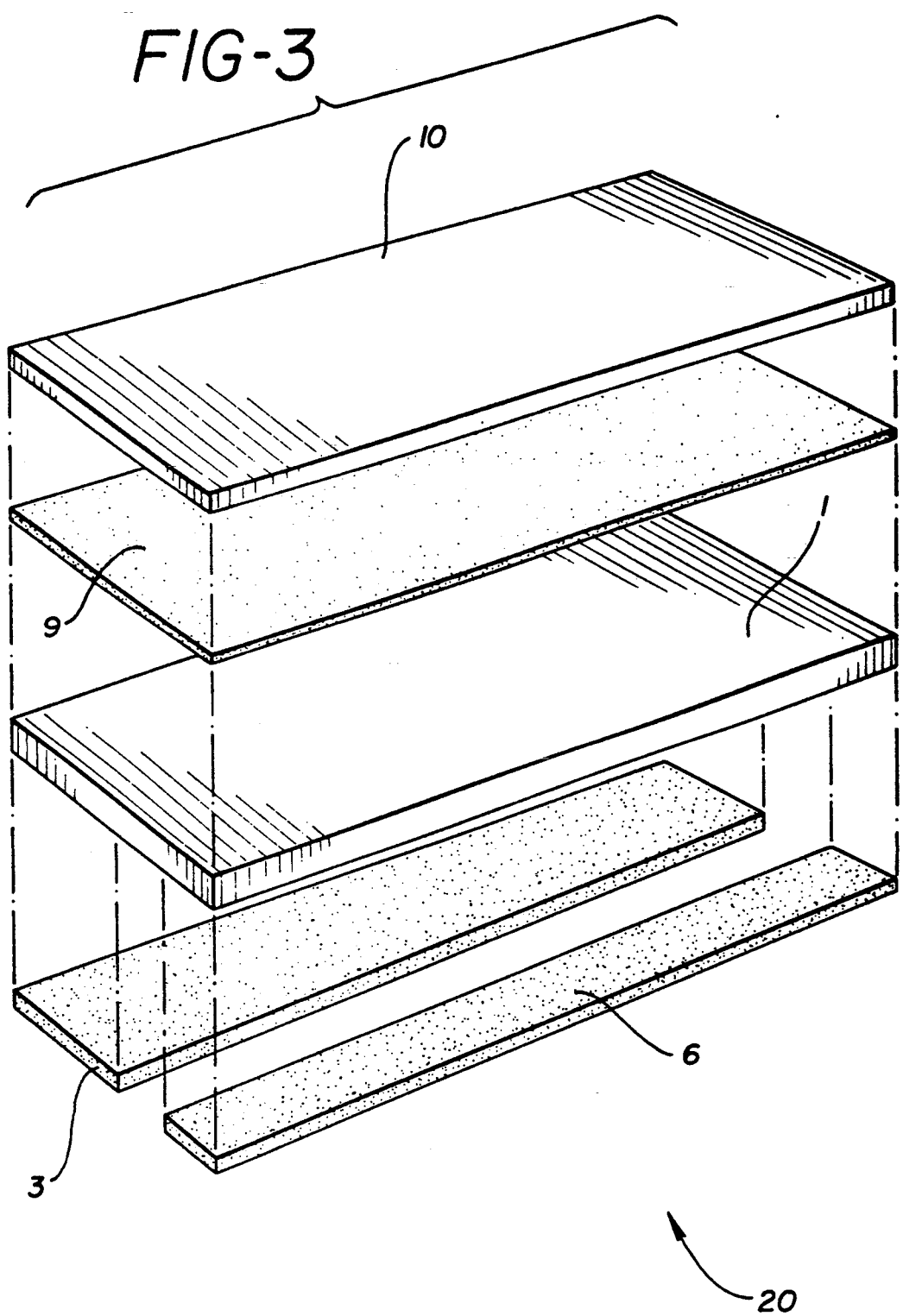

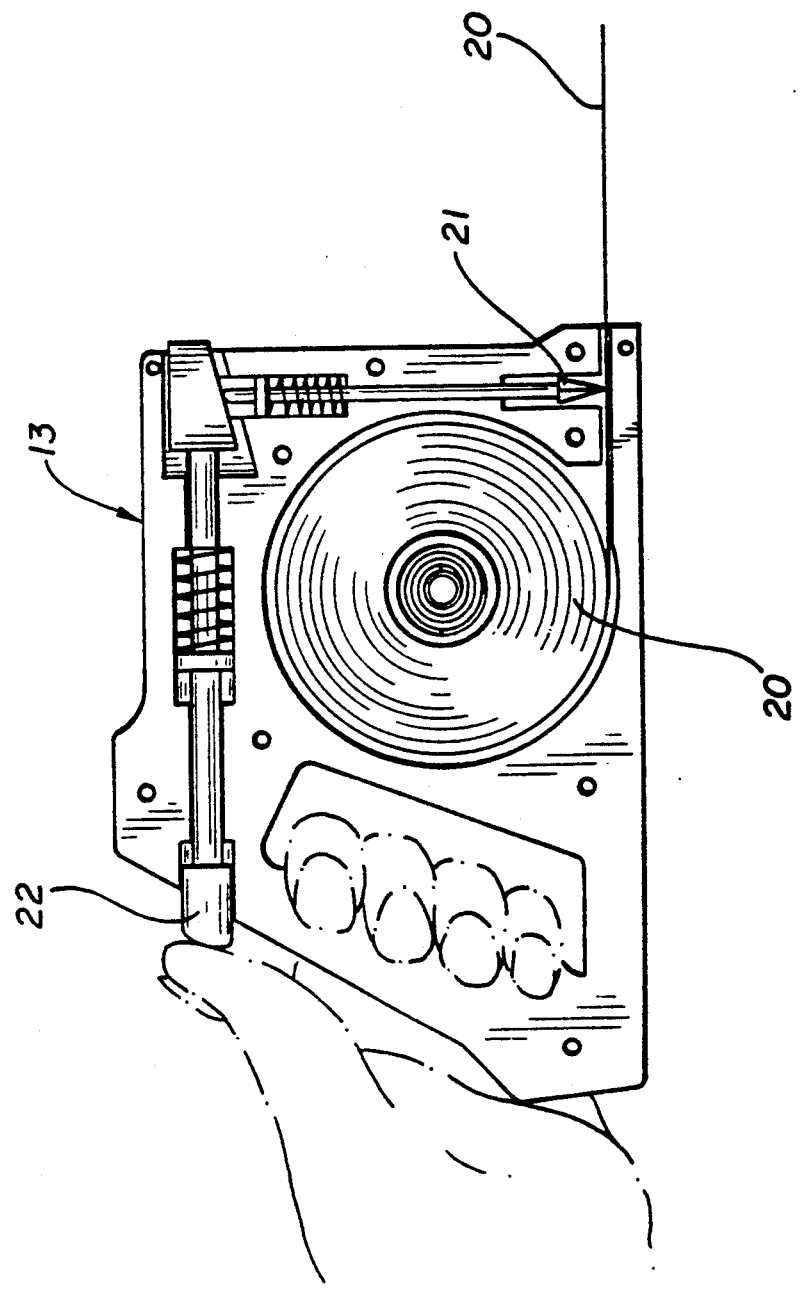

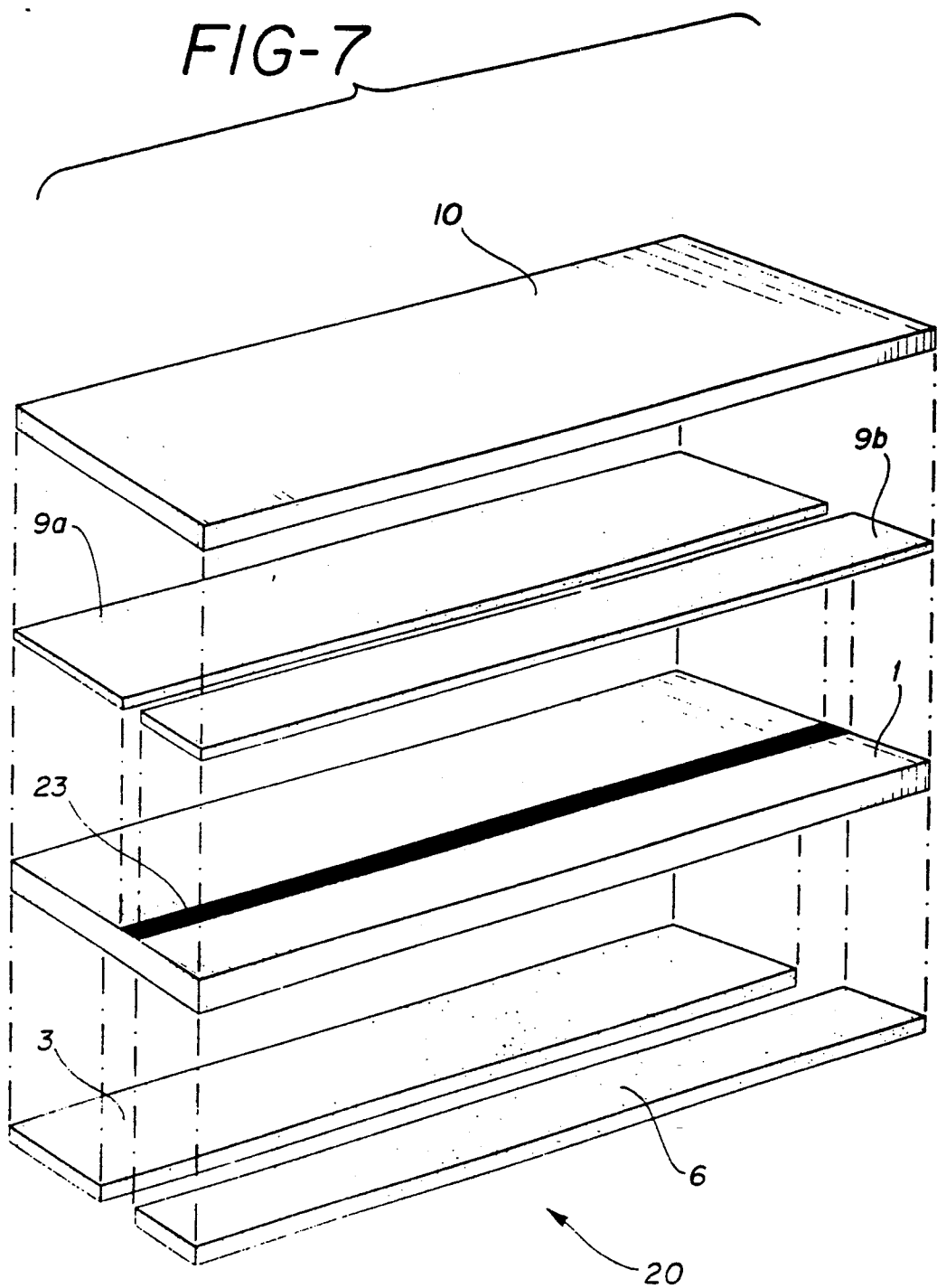

SPLICER TAPE SYSTEM

This application is a continuation-in-part of prior U.S. application Ser. No. 807,440, filed on Dec. 13, 1991.

BACKGROUND OF THE INVENTION

This invention generally relates to web splicing and more particularly to the splicing of the leading end portion of a new or fresh roll of web to the trailing end portion of an active or running web traveling through a continuous web processing line such as a printing press or the like. The invention is applicable both to systems in which a splice is made on the fly and to systems in which the splice is made while the running web is stationary.

The operation of splicing systems, particularly those which operate on the fly wherein the web continues at full speed with no interruption for the splicing operation, requires a tape system which can be utilized without requiring interruption of the continuous web processing line. While various splicing tapes have been known in the art, they encounter a number of drawbacks. A common prior art tape method is shown in FIG. 4, but this requires separate tapes to be applied and excessive preparation by an operator. Another tape system is shown in U.S. Pat. No. 4,905,924, however with this splicing tape a portion of the tape remains on the body of the fresh or new roll.

SUMMARY OF THE INVENTION

Briefly, a splicer tape is provided for holding down the leading end portion of the outer layer of a new roll of web and for enabling the leading end portion of the new roll to be spliced to the trailing end portion of an active web. The tape contains an elongated strip of carrier material having inner and outer sides with the inner side of the strip having a first and second longitudinally extending sections. Preferably the tape has an intermediate longitudinally extending section located between the first and second sections, said intermediate section being free of adhesive. A first adhesive is applied onto the first section and comprises a non-releasable adhesive which is to be applied against the leading end portion of the new roll. A second adhesive is applied onto the second section of the inner side of the carrier strip and comprises a releasable adhesive which is to be applied against the body of the new roll to hold the leading edge of the new roll down until the leading edge of the new roll is spliced to the trailing end portion of the active web whereupon the second adhesive releases from the body of the new roll without leaving any portion of the tape on the roll body. A third adhesive is applied on the outer side of the carrier strip and it comprises a non-releasable adhesive which is to be applied against trailing end portions from the active web during splicing. Preferably, a removable protective cover covers the third adhesive, this cover to be removed after the tape is applied onto a new roll and before it is spliced to an active web.

BRIEF DESCRIPTION OF THE DRAWINGS

FIG. 3 is an exploded perspective view of the splicer tape showing the elements thereof.

FIG. 6 is a side view of a tape dispenser containing the splicer tape of this invention.

FIG. 7 is an exploded perspective view of the splicer tape of FIG. 1A having on the outer side of the carrier strip two longitudinally extending sections with an intermediate section free of adhesive which is colored.

DETAILED DESCRIPTION OF THE INVENTION

Figure 1:
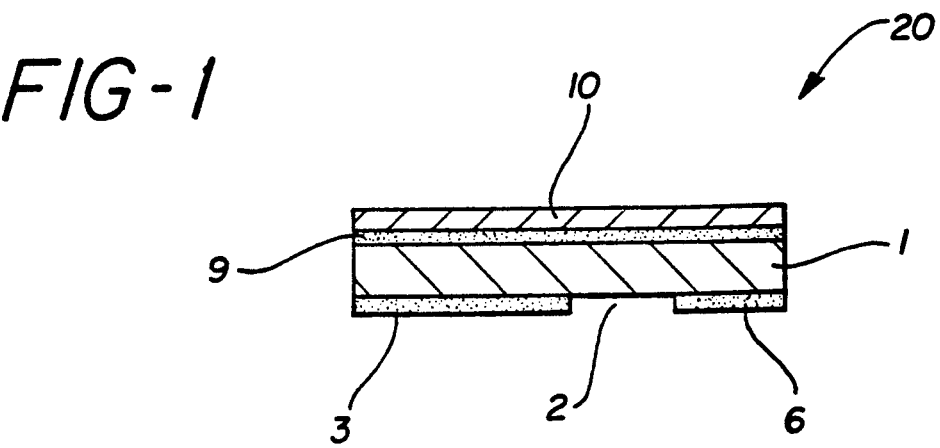
FIGS. 1 and 1A are end views of embodiments of the splicer tape.

A splicer tape system is provided for splicing the leading end of a new roll of web to the trailing end of an active web and in particular allowing such splicing to be carried out at full web speeds which is important to the continuous and automatic operation of printing presses. The elements of the splicer tape (20) are illustrated in FIGS. 1 and 3 and comprise an elongated strip of carrier material (I) to which adhesives are applied to its outer and inner sides.

Figure 2:
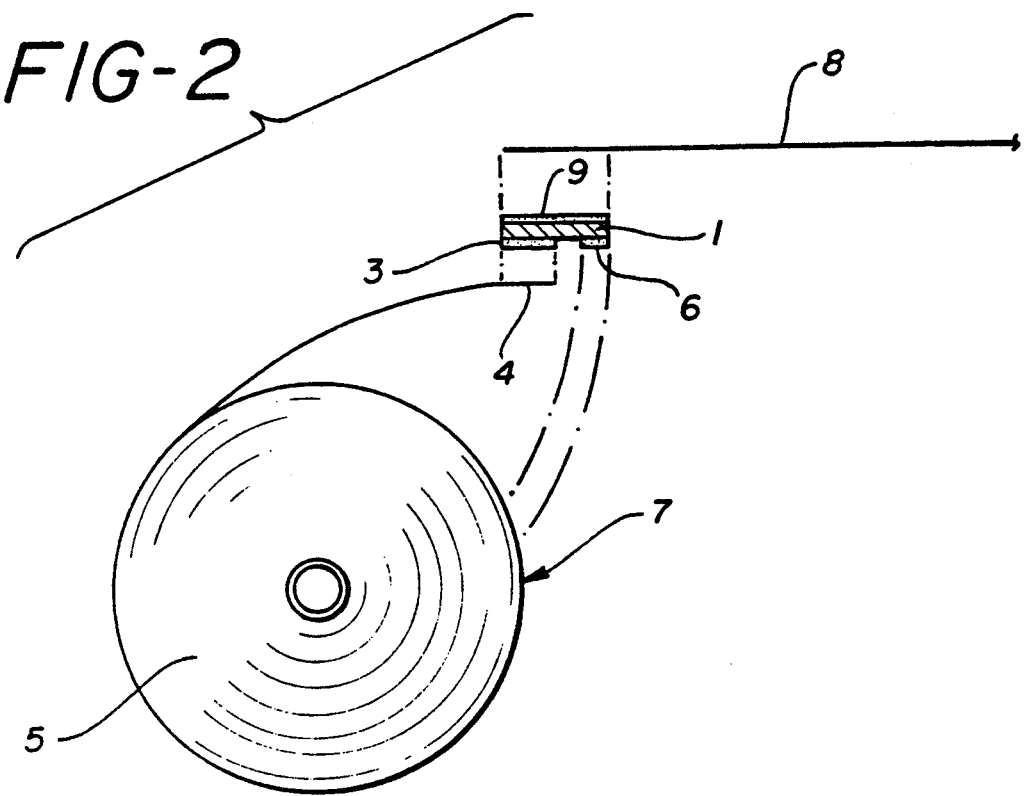
FIG. 2 is an end view of a splicer tape as applied to a body of a new roll and to the tail or trailing end portion of an active web.

The inner side of the carrier strip (1) has a first longitudinally extending section and a second longitudinally extending section. Preferably the inner side also has an intermediate longitudinally extending section (2), located between the first and second sections with the intermediate section (2) being free of adhesive for ease of application of the splicer tape. The first longitudinally extending section has a first adhesive (3) thereon, the adhesive being a non-releasable adhesive which is to be applied against the leading end portion (4) of a new roll (5) as shown in FIG. 2. The second longitudinally extending section on the inner side of the carrier strip (1) has a second adhesive (6) applied thereto, the adhesive being a releasable adhesive which is to be applied against the body (7) of the new roll (5) in order to hold the leading end portion (4) of the new roll down until the leading end portion (4) of the new roll (5) is spliced to the trailing end portion (8) of an active web, whereupon the second adhesive (6) releases from the body (7) of the new roll (5) without leaving any portion of the tape on the new roll body (7).

The outer side of the carrier strip has a third adhesive (9) applied thereto, the adhesive being a non-releasable adhesive which is to be applied against the trailing end portion (8) of an active web during splicing. The third adhesive preferably has a protective cover (10) covering its outer surface, this cover to be removed after the tape is applied onto a new roll (5) but before it is to be spliced to the trailing edge (8) of an active web.

Figure 1A:
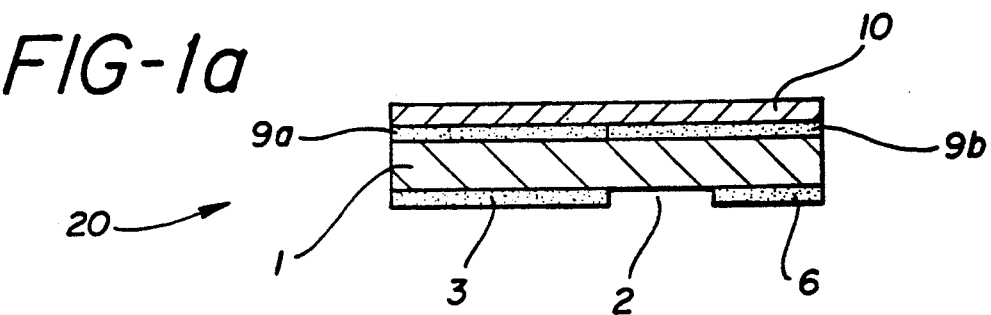

In an alternate embodiment as shown in FIG. 1A, the outer side of the carrier strip (1) has a third adhesive divided into two longitudinally extending sections (9a) and (9b) to provide two different types of non-releasable adhesive, i.e., a high tack adhesive and a heat resistant adhesive, in order to provide a tape in which the splice will hold even when heat is applied as in heat set presses. A high tack adhesive is preferred in order to efficiently splice the leading end portion of (4) of the new roll (5) to the trailing end portion (8) of an active web, however, many high tack adhesives lose their adhesion upon the application of heat. Thus, the third adhesive may contain a section containing a heat resistant adhesive which may be lower in tack, but which maintains adhesion upon the application of heat. The two longitudinally extending sections (9a) and (9b) may abut each other, or as shown in FIGS. 1A and 7 there may be an intermediate longitudinally extending section free of adhesive between them (e.g. 1/16 inch wide) which if colored (e.g. by use of a black carrier strip 23 as shown in FIG. 7) can be used to time the splice application. A longitudinally extending section on the outer side of the carrier strip which is colored for timing the splice operation can be positioned anywhere on the strip.

The materials for the carrier, protective cover and the adhesive utilized in the splicer tape are within the skill of those in the art to choose based upon the type of web material which needs to be spliced as well as the speeds under which the web will be traveling and thus the adhesive strength which is needed for the particular web material and speeds to be encountered.

The splicer tape may be any width as desired, but is preferably within the range of about 1 to 2 inches. With such splicer tape width, the width of the first adhesive (3) is preferably within the range of about ½ to 1 inch, preferably about 50% of the splicer tape width, the width of the second adhesive (6) is preferably within the range of about ¼ to ½ inch. Preferably the width of the intermediate section (2) which is free of adhesive is the remainder of the width, preferably at least ¼ inch for ease of application of the splicer tape by the press operator. The use of a splicer tape without an intermediate section free of adhesive is functional due to the releasable nature of the second adhesive.

Various materials as are common in the art may be utilized for the carrier strip (1) including various paper stocks (e.g. 20 lb. virgin Kraft bleached), polyester films and UPVC films. Various materials as are common in the art may be utilized for the protective cover (10) including release paper which is a paper coated on both sides with silicon to provide good release characteristics with respect to the adhesives described herein. Various adhesives as are known by those skilled in the art may be utilized for the first adhesive (3) and the third adhesive (9), which are pressure-sensitive non-releasable adhesives, i.e., the adhesive will not release from the surface it is applied against under conditions to be encountered during splicing of the new roll to the active web. Suitable adhesives include 3M Type 906, a high tack repealable flying splice tape; or 3M Type 922XL which is a firm acrylic adhesive with high temperature resistance or 3M Type 9772 which is a medium firm acrylic adhesive with good heat resistance (sold by Minnesota Mining and Manufacturing Co.).

A suitable adhesive for the second adhesive (6), which is a pressure sensitive moderate adhesive and will release from the body (7) of the new roll (5) during the splicing operation, includes 3M Post-It adhesives (manufactured by Minnesota Mining and Manufacturing Company) and the 3M Scotch Brand High-Tack/Low-Tack Double Coated Film Tape Y-9415 which has a high tack acrylic on one side of a polyester film and a low tack acrylic on the other.

Figure 4A:
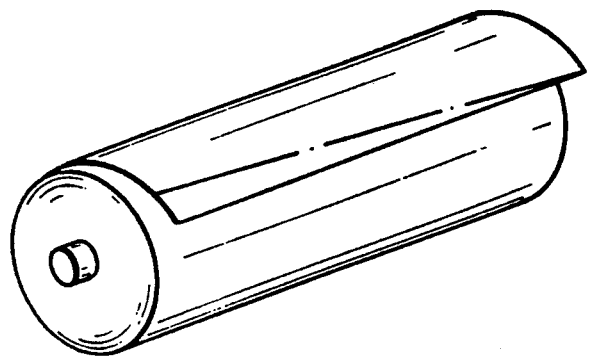
FIG. 4 shows a prior art splicer tape and its application to a new roll of web, with FIG. 4A showing cutting the leading edge of the new roll at an angle, with FIG. 4B showing taping the leading edge to the body of the roll, and with FIG. 4C showing applying a transfer tape to the outside surface of the leading edge.
Figure 4B:
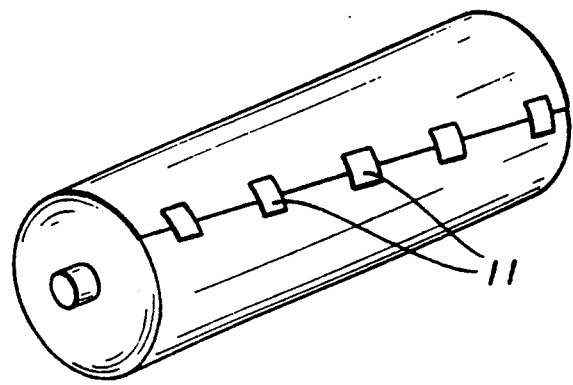
Figure 4C:
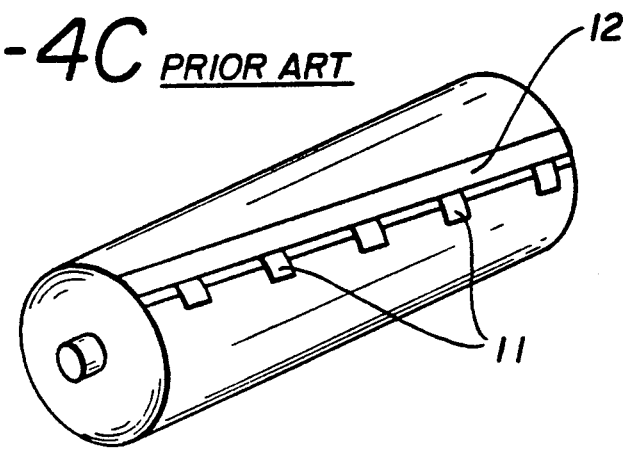
Figure 5A:
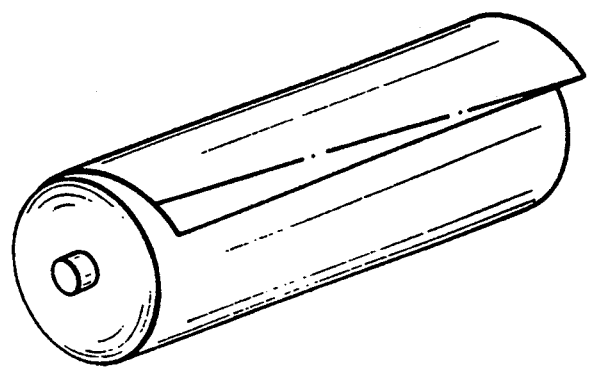
FIG. 5 shows the tape of this invention as applied to a new roll of web, with FIG. 5A showing cutting the leading edge of a new roll, with FIG. 5B showing applying the splicer tape to the new roll, and with FIG. 5C showing peeling of the protective cover.
Figure 5B:
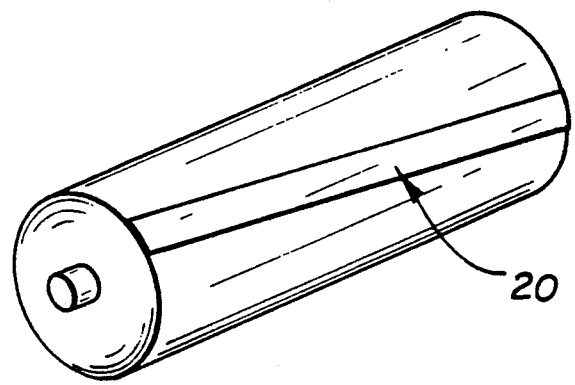
Figure 5C:
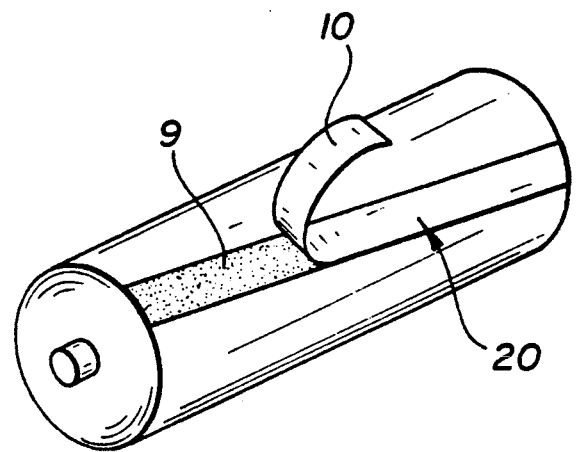

As shown in FIG. 4, in the prior art, the steps in applying a commonly used splicing system was in Step A to cut the leading edge of a new roll at an angle, then in Step B tape the leading edge to the body of the roll with common tape (11), and in Step C applying a transfer tape (12) to the outer surface of the leading edge. In this invention, as shown in FIG. 5, the steps of utilizing the splicer tape involves, in Step A, cutting the leading edge of a new roll, preferably at an angle. The second step, Step B, involves applying the splicer tape (20) to overlap the leading end portion (4) of the new roll (5) to the body (7) of the new roll (5). The third step, Step C, involves peeling off the protective cover (10) prior to the splicing operation. In use, as shown in FIG. 2, the third adhesive (9) non-releasably adheres to the trailing end portion (8) of an active web and the second adhesive (6) when pulled during the splicing operation releases from the body (7) of the new roll (5) and since the first adhesive (3) is non-releasably attached to the leading end portion (4) of the new roll (5) the splicing is complete and the web continues to continuously move while being attached to the new roll.

In one preferred embodiment of this invention the tape can be wound up in a roll for ease of application, use and storage. In this embodiment, the first and second adhesive are releasable from the outer surface of the protective cover in order that the roll can be unwound efficiently.

In an embodiment of this invention, a roll of splicer tape (20) is provided in a tape dispenser as shown in FIG. 6 which allows for ease of application of the tape to the leading edge of the new roll. This tape dispenser preferably has a knife (21) for severing the ends of the tape which is thumb activated (22) on application of the tape to the leading end portion of the new roll of web.

EXAMPLE

The splicer tapes as shown in FIG. 1 are made utilizing a carrier material 2" wide made out of coated and non-coated paper, a first adhesive (3) 1" wide made out of 3M Type 906 splice tape, a second adhesive (6) ¼" wide made out of 3M Type Y-9415 film tape and with a third adhesive (9) made out of 3M type 906 splice tape.

The splicer tape is applied as shown in FIG. 5 to a roll of various paper stocks including newspaper stock and various coated paper stocks. The splicing is carried out on the fly at speeds of up to 2200 feet per minute. The splicing is made with no remnant of the tape being left on the body of the new roll to detrimentally affect the printing operation.

What is claimed is:

1. A splicer tape for holding down the leading end portion of the outer layer of a new roll of web and for enabling the leading end portion of the new roll to be spliced to the trailing end portion of an active web, said tape consisting essentially:
    an elongated strip of carrier material to which adhesives are to be applied onto its outer and inner sides, said inner side of said strip having a first and second longitudinally extending section;
    a first adhesive on the first section comprising a nonreleasable adhesive which is applied against the leading end portion of the new roll;
    a second adhesive on the second section comprising a releasable adhesive which is applied against the body of the new roll to hold the leading edge of the new roll down until the leading edge of the new roll is spliced to the trailing end portion of an active web whereupon the second adhesive releases from the body of the new roll without leaving any portion of the tape on the roll body; and a third adhesive on the outer side of the strip comprising a non-releasable adhesive which is to be applied against the trailing end portion of an active web during splicing.

2. Tape of claim 1 further comprising an intermediate longitudinally extending section located between said first and second sections, said intermediate section being free of adhesive.

3. Tape of claim 2 further comprising a protective cover on the third adhesive which is to be removed after the tape is applied onto a new roll but before it is spliced to an active web.

4. Tape of claim 3 wherein the third adhesive is divided into two longitudinally extending sections, one containing a high tack adhesive and the other containing a heat resistant adhesive.

5. Tape of claim 4 wherein there is an intermediate longitudinally extending section free of adhesive between the two longitudinally extending sections of the third adhesive.

6. Tape of claim 5 wherein the intermediate section free of adhesive between the sections of the third adhesive is colored for use in timing the splice application.

7. Tape of claim 3 wherein the first and second adhesives are releasable from the outer surface of the protective cover.

8. Tape of claim 7 wherein prior to application to the leading end portion of the outer layer of a new roll of web the tape is in the form of a roll.

9. Tape of claim 8 wherein the roll of tape is in a tape dispenser which has a knife for severing the ends of the tape upon application of the tape to the leading end portion of a new roll of web.

10. Tape of claim 1 wherein the width of the splicer tape is from about 1 to 2 inches.

11. Tape of claim 10 wherein the width of the first adhesive is from about $\frac{1}{2}$ to 1 inch.

12. Tape of claim 11 wherein the width of the second adhesive is from about $\frac{1}{4}$ to $\frac{1}{2}$ inch.

13. Tape of claim 12 wherein the width of the intermediate section is at least $\frac{1}{4}$ inch.

14. Tape of claim 1 wherein there is a longitudinally extending section on the outer side of the strip which is colored for use in timing the splice application.

* * * * *